United States Patent
Takahashi

(10) Patent No.: US 7,027,095 B2
(45) Date of Patent: Apr. 11, 2006

(54) APPARATUS AND METHOD FOR THE EXPOSURE CONTROL OF A PHOTOGRAPHING DEVICE

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 762 days.

(21) Appl. No.: 10/066,063

(22) Filed: Feb. 4, 2002

(65) Prior Publication Data

US 2002/0118971 A1 Aug. 29, 2002

(30) Foreign Application Priority Data

Feb. 9, 2001 (JP) ............................. 2001-034120

(51) Int. Cl.
*G03B 7/00* (2006.01)
*H04N 5/235* (2006.01)

(52) U.S. Cl. .................. 348/362; 348/229.1; 348/221.1
(58) Field of Classification Search ........ 348/362–368, 348/229.1, 234–238, 221.1, 222.1
See application file for complete search history.

(56) References Cited

U.S. PATENT DOCUMENTS

| 5,223,935 | A | * | 6/1993 | Tsuji et al. | 348/364 |
| 5,459,512 | A | * | 10/1995 | Kawahara | 348/363 |
| 5,510,837 | A | * | 4/1996 | Takei | 348/362 |
| 5,959,670 | A | * | 9/1999 | Tamura et al. | 348/364 |
| 6,618,091 | B1 | * | 9/2003 | Tamura | 348/363 |
| 6,630,960 | B1 | * | 10/2003 | Takahashi et al. | 348/364 |
| 6,831,696 | B1 | * | 12/2004 | Saeki | 348/362 |
| 2002/0186313 | A1 | * | 12/2002 | Kidono et al. | 348/362 |

FOREIGN PATENT DOCUMENTS

JP A2000-50152 2/2000

* cited by examiner

*Primary Examiner*—Ngoc-Yen Vu
*Assistant Examiner*—Kelly Jerabek
(74) *Attorney, Agent, or Firm*—Morgan & Finnegan, LLP

(57) ABSTRACT

An exposure control apparatus according to this invention includes an image sensing unit that senses an object image, and an exposure controller that performs the exposure control for photographing by selectively using a first exposure control mode in which an exposure value for photographing is determined while exposure control is performed in accordance with the brightness of object images repetitively sensed by the image sensing unit, and a second exposure control mode in which an exposure value for photographing is determined by performing exposure control by using a plurality of preset exposure values.

6 Claims, 3 Drawing Sheets

APPARATUS AND METHOD FOR THE EXPOSURE CONTROL OF A PHOTOGRAPHING DEVICE

FIELD OF THE INVENTION

The present invention relates to an exposure control apparatus for determining correct exposure in a digital camera or the like.

BACKGROUND OF THE INVENTION

A feedback type exposure determining means is one means for determining exposure in a digital camera. That is, to always optimize the brightness of a liquid crystal screen of a digital camera, exposure is corrected by moving around at any instant, and image sensing exposure is determined by using data of the feedback type exposure determining means.

Also, a scan type exposure determining means performs photometry a plurality of times by using a plurality of predetermined exposure values, in order to compensate for abrupt brightness changes caused by scene changes. On the basis of this photometric data, optimum exposure is determined.

Unfortunately, the feedback type exposure determining means limits a time constant or correction value to some extent, in order to prevent oscillation of the exposure value. Therefore, this means cannot rapidly compensate for brightness changes caused by abrupt scene changes and hence cannot obtain correct exposure.

In addition, it is substantially impossible to effectively use the feedback system in an optical finder type digital camera having no liquid crystal screen or when a liquid crystal screen is turned off.

Also, the scan type exposure determining means must perform exposure a plurality of times. This produces a shutter release time lag.

SUMMARY OF THE INVENTION

The present invention has been made in consideration of the above situation, and has as its object to provide an exposure control method and apparatus, program, and storage medium capable of correct exposure control.

To achieve the above object, an apparatus according to the present invention is characterized by the following arrangement.

That is, the apparatus comprises (A) an image sensing unit that senses an object image, and (B) an exposure controller that performs the exposure control for photographing by selectively using a first exposure control mode in which an exposure value for photographing is determined while exposure control is performed in accordance with the brightness of object images repetitively sensed by the image sensing unit, and a second exposure control mode in which an exposure value for photographing is determined by performing exposure control by using a plurality of preset exposure values.

An method according to the present invention is characterized by the following arrangement.

That is, the exposure control method comprises (A) the image sensing step of sensing an object image, and (B) the exposure control step of performing the exposure control for photographing by selectively using a first exposure control mode in which an exposure value for photographing is determined while exposure control is performed in accordance with the brightness of object images repetitively sensed in the image sensing step, and a second exposure control mode in which an exposure value for photographing is determined by performing exposure control by using a plurality of preset exposure values.

A program according to the present invention is characterized by the following arrangement.

That is, the program causes a computer to execute the exposure control method described above.

A storage medium according to the present invention is characterized by the following arrangement.

That is, the storage medium stores the above-mentioned program in a computer-readable form.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be described in detail in accordance with the accompanying drawings.

Figure 1:
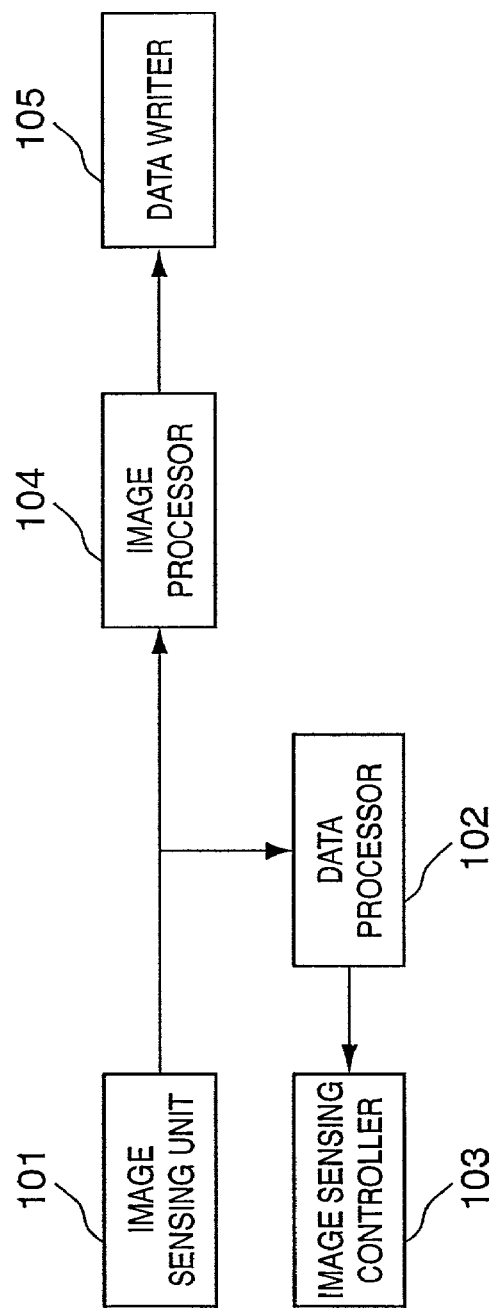
FIG. 1 is a block diagram showing the arrangement of a digital camera according to an embodiment of the present invention.

FIG. 1 is a block diagram showing an outline of the arrangement of a digital camera of the present invention. First, an operation when a liquid crystal finder is ON before a shutter is pressed will be explained below.

An image sensing unit 101 contains a lens system, aperture, shutter, electronic shutter, CCD, A/D converter, and the like. An image projected onto the CCD by the lens system is output as a digital signal. To make an average luminance value Y of the digital signal obtained by this image sensing unit 101 equal to brightness Yref as a target, a data processor 102 calculates control signal values for controlling the aperture and the electronic shutter speed.

Figure 2:
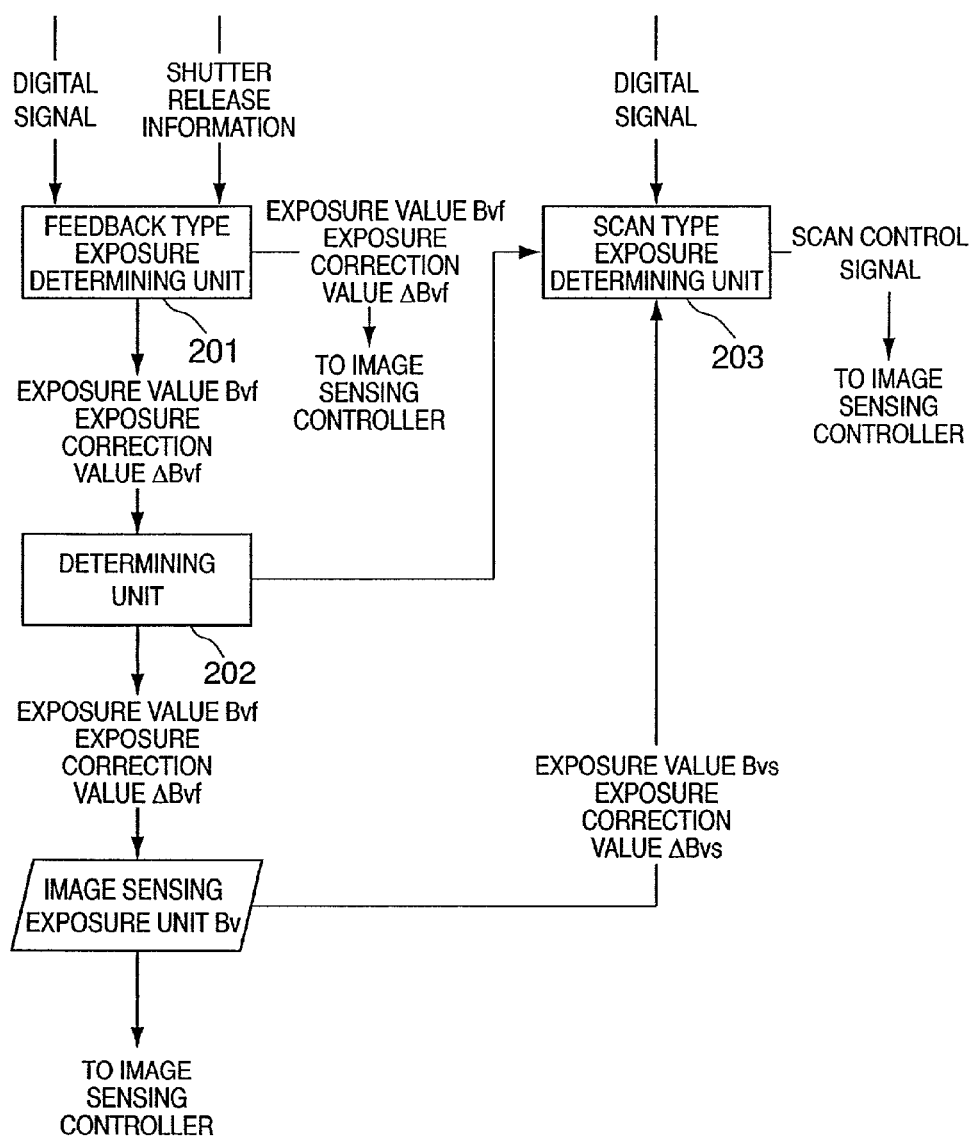
FIG. 2 is a block diagram showing the arrangement of a data processor according to the embodiment of the present invention.

FIG. 2 is a block diagram showing this data processor 102 in more detail. Referring to FIG. 2, the digital signal obtained by the image sensing unit 101 is supplied to a feedback type exposure determining unit 201. This feedback type exposure determining unit 201 calculates an average luminance value Y of the digital signal. On the basis of this average luminance value Y, a control signal value Bvf to be supplied to an image sensing controller 103 is calculated.

The following expressions are for calculating the control signal value Bvf for controlling the average value Y of the digital signal and Yref. In these expressions, Av is the aperture control value, Tv is the electronic shutter control value, Sv is the CCD sensitivity control value, and Bvf is the control signal value. ΔBvf (exposure correction value) and Bvf values calculated by these expressions are held until these values are calculated next.

$$\Delta Bvf = \log 2(Y/Yref)$$

$$Bv = Av + Tv - Sv$$

$$Bvf = Bv + \Delta Bvf$$

On the basis of the control signal value Bvf received from the data processor 102, the image sensing controller 103 controls the aperture and electronic shutter in the image sensing unit 101. By performing this control by feedback, the average value Y of the output digital signal from the image sensing unit 101 is made equal to Yref at any instant.

An operation upon shutter release will be described next.

When the shutter is released, the ΔBvf and Bvf values held in the feedback type exposure determining unit 201 are read out. A determining unit 202 calculates the absolute value (to be referred to as "ABS(ΔBvf)" hereinafter) of the readout ΔBvf value and compares this ABS(ΔBvf) with a preset threshold value ΔBvTH.

If ABS(ΔBvf)<ΔBvTH, the control value Bvf is supplied as an image sensing exposure value Bv to the image sensing controller 103, and main exposure image sensing (photographing) is performed by controlling the aperture and shutter. If ABS(ΔBvf)≧ΔBvTH, this information is sent to a scan type exposure determining unit 203, and scan type exposure control is performed.

This scan type exposure control will be explained below.

Photometry is performed using three control values Bv0, Bv1, and Bv2 corresponding to predetermined different exposure values. Letting Y0, Y1, and Y2 denote the average luminance values of digital data obtained by these control values and Yref denote the target luminance value, three control values ΔBv0, A Bv1, and ΔBv2 can be calculated by $$\Delta Bv0 = \log 2(Y0/Yref)$$

$$\Delta Bv1 = \log 2(Y1/Yref)$$

$$\Delta Bv2 = \log 2(Y2/Yref)$$

An exposure control value BvS is calculated on the basis of the smallest one of ABS(ΔBv0), ABS(ΔBv1), and ABS (ΔBv2). For example, if ABS(ΔBv1) is the smallest of ABS(ΔBv0), ABS(ΔBv1), and ABS(ΔBv2), BvS is calculated by the following expressions. In these expressions, Av1, Tv1, and Sv1 are the aperture control value, electronic shutter control value, and CCD sensitivity control value, respectively, corresponding to the exposure control value Bv1.

$$Bv1 = Av1 + Tv1 - Sv1$$

$$BvS = Bv1 + \Delta Bv1$$

The calculated control value BvS is supplied as the image sensing exposure value Bv to the image sensing controller 103, and main exposure image sensing is performed by controlling the aperture and shutter. A digital signal obtained by this main exposure image sensing by the image sensing unit 101 is supplied to an image processor 104 where the signal is subjected to color processing and image processing such as luminance processing, edge emphasis, gamma processing, and JPEG conversion. The processed signal is supplied to a data writer 105, and the data is written in a recording medium.

When the scan type exposure control is performed in this embodiment, photometry is performed three times before an image sensing exposure value is calculated. However, the number of times of photometry is not limited to 3; it can be reduced to 2 or increased to 4 or 5.

The second embodiment of the present invention will be described below.

Figure 3:
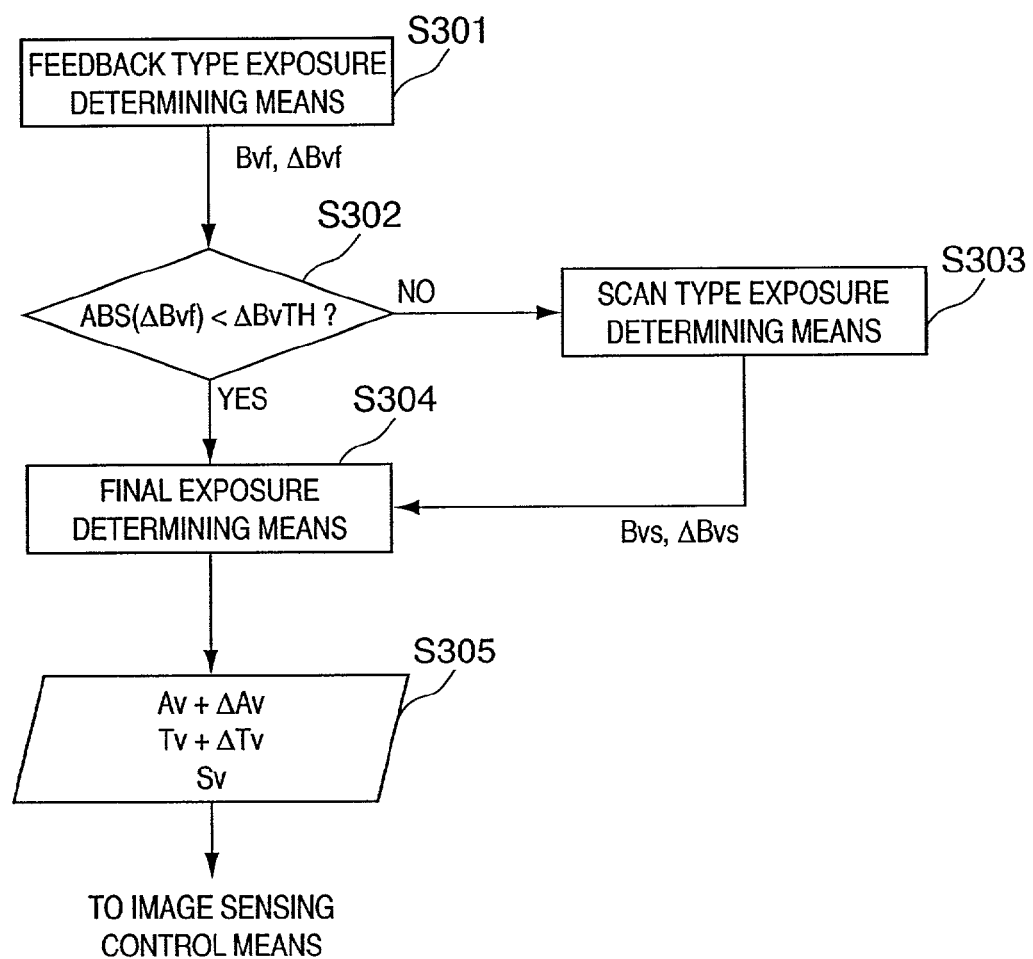
FIG. 3 is a flow chart showing the flow of processing according to the second embodiment of the present invention.

FIG. 3 is a flow chart showing the operation of this embodiment. Referring to FIG. 3, in step S301 a feedback type exposure determining means always monitors sensed image data and performs feedback control such that the average luminance of the image is consistent with a target value at any instant. Exposure control values ΔBvf and Bvf calculated for each feedback loop are held until new data is obtained.

When a shutter is released, an absolute value ABS(ΔBvf) of the ΔBvf value held in the feedback type exposure determining means at that time is compared with preset ΔBvTH (step S302). If ABS(ΔBvf)<ΔBvTH, in step S304 BvF is supplied as an exposure control value to a final exposure value determining means.

If ABS(ΔBvf)≧ΔBvTH, an exposure control value Bvs calculated in step 303 by a scan type exposure determining means is supplied to the final exposure determining means (step S304).

In step S304, the exposure determining means determines an aperture value Av, a shutter speed value Tv, and a CCD sensitivity value Sv for use in image sensing, on the basis of the received exposure control value (Bvf or Bvs), and performs pre-exposure by this setting. On the basis of the data obtained by this pre-exposure, the exposure determining means calculates an average luminance Yave of the image and calculates a brightness difference ΔBv1 from the target luminance.

This ΔBv1 is calculated by $$\Delta Bv1 = \log 2(Yave/Yref)$$

To correct this ΔBv1 to 0, ΔAv and ΔTv are calculated. Calculated ΔAv and ΔTv are supplied, together with Av, Tv, and Sv, to an image sensing control means (step S305).

Each of the functional blocks and procedures presented in the above embodiments can be implement by hardware. It is also possible to implement each functional block or procedure by a microcomputer system including a CPU or MPU, ROM, RAM, and the like, and to implement the operation of the block or procedure in accordance with an operation program store in the ROM or RAM. The present invention also includes a case in which, in order to implement the functions of the individual functional blocks described above, the program of software for implementing these functions is supplied to the RAM, and the functional blocks are operated in accordance with the program.

In this case, the program of the software implements the functions of the above embodiments, and the program itself and means for supplying this program to the computer, e.g., a storage medium storing the program, constitute the present invention. As this storage medium storing the program, it is possible to use, in addition to the ROM and RAM, a floppy disk, hard disk, optical disk, magnetooptical disk, CD-ROM, CD-I, CD-R, CD-RW, DVD, zip, magnetic tape, nonvolatile memory card, and the like.

Also, besides the functions of the above embodiments are implemented by executing the supplied program by the computer, the present invention includes a case where this program implements the functions of the above embodiments in collaboration with an OS (Operating System) or the like running on the computer.

Furthermore, the present invention also includes a case where the supplied program is stored in a memory of a function extension board of the computer or of a function extension unit connected to the computer, and, in accordance with designations by the program, a CPU or the like of the function extension board or function extension unit performs part or the whole of actual processing and thereby implements the functions of the above embodiments.

In the present invention, the whole or part of claims or of the arrangements of the embodiments can form a single apparatus, can connect to another apparatus, or can be an element constituting an apparatus.

The present invention is applicable to various forms of cameras such as a digital camera for sensing moving images or still images, a camera using silver halide films, a single-lens reflex camera, a lens shutter camera, and a monitor camera; an image sensing apparatus other than cameras, an image reading apparatus, an optical apparatus, and some other apparatus; apparatuses applied to these cameras, image sensing apparatus, image reading apparatus, optical apparatus, and some other apparatus; elements constituting these apparatuses; and control methods of these apparatuses.

In the above embodiments as described above, in accordance with whether an abrupt scene change occurs in an image sensing method or apparatus of the above sort, a feedback type exposure determining means or a scan type exposure determining means properly controls exposure. Consequently, a correct exposure value can be obtained at all times.

The present invention is not limited to the above embodiments and various changes and modifications can be made within the spirit and scope of the present invention. Therefore, to apprise the public of the scope of the present invention the following claims are made.

What is claimed is:

1. An apparatus comprising:
(A) an image sensing unit that senses an object image; and
(B) an exposure controller that performs exposure control for photographing by selectively using a first exposure control mode in which an exposure value for photographing is determined while exposure control is performed in accordance with the brightness of object images repetitively sensed by said image sensing unit, and a second exposure control mode in which an exposure value for photographing is determined by performing exposure control by using a plurality of preset exposure values,
wherein on the basis of whether an exposure correction value obtained in the first exposure control mode is smaller than a predetermined value, said exposure controller determines whether to perform the exposure control for photographing by using the exposure value determined in the first exposure control mode or by using the exposure value determined in the second exposure control mode,
wherein if the exposure correction value obtained in the first exposure control mode is smaller than the predetermined value, said exposure controller performs the exposure control for photographing by using the exposure value determined in the first exposure control mode, and, if the exposure correction value obtained in the first exposure control mode is larger than the predetermined value, said exposure controller performs the exposure control for photographing by using the exposure value determined in the second exposure control mode.

2. An apparatus comprising:
(A) an image sensing unit that senses an object image; and
(B) an exposure controller that performs exposure control for photographing by selectively using a first exposure control mode in which an exposure value for photographing is determined while exposure control is performed in accordance with the brightness of object images repetitively sensed by said image sensing unit, and a second exposure control mode in which an exposure value for photographing is determined by performing exposure control by using a plurality of preset exposure values, wherein on the basis of whether an absolute value of an exposure correction value obtained in the first exposure control mode is smaller than a predetermined value, said exposure controller determines whether to perform the exposure control for photographing by using the exposure value determined in the first exposure control mode or by using the exposure value determined in the second exposure control mode.

3. The apparatus according to claim 2, wherein if the absolute value of the exposure correction value obtained in the first exposure control mode is smaller than the predetermined value, said exposure controller performs the exposure control for photographing by using the exposure value determined in the first exposure control mode, and, if the absolute value of the exposure correction value obtained in the first exposure control mode is larger than the predetermined value, said exposure controller performs the exposure control for photographing by using the exposure value determined in the second exposure control mode.

4. An exposure control method comprising:
(A) the image sensing step of sensing an object image; and
(B) the exposure control step of performing the exposure control for photographing by selectively using a first exposure control mode in which an exposure value for photographing is determined while exposure control is performed in accordance with the brightness of object images repetitively sensed in the image sensing step, and a second exposure control mode in which an exposure value for photographing is determined by performing exposure control by using a plurality of preset exposure values,
wherein on the basis of whether an exposure correction value obtained in the first exposure control mode is smaller than a predetermined value, the exposure control step comprises determining whether to perform the exposure control for photographing by using the exposure value determined in the first exposure control mode or by using the exposure value determined in the second exposure control mode,
wherein if the exposure correction value obtained in the first exposure control mode is smaller than the predetermined value, the exposure control step comprises performing the exposure control for photographing by using the exposure value determined in the first exposure control mode, and, if the exposure correction value obtained in the first exposure control mode is larger than the predetermined value, the exposure control step comprise performing the exposure control for photographing by using the exposure value determined in the second exposure control mode.

5. An exposure control method comprising:
(A) the image sensing step of sensing an object image; and (B) the exposure control step of performing the exposure control for photographing by selectively using a first exposure control mode in which an exposure value for photographing is determined while exposure control is performed in accordance with the brightness of object images repetitively sensed in the image sensing step, and a second exposure control mode in which an exposure value for photographing is determined by performing exposure control by using a plurality of preset exposure values, wherein on the basis of whether an absolute value of an exposure correction value obtained in the first exposure control mode is smaller than a predetermined value, the exposure control step comprises determining whether to perform the exposure control for photographing by using the exposure value determined in the first exposure control mode or by using the exposure value determined in the second exposure control mode.

6. The method according to claim 5, wherein if the absolute value of the exposure correction value obtained in the first exposure control mode is smaller than the predetermined value, the exposure control step comprise performing the exposure control for photographing by using the exposure value determined in the first exposure control mode, and, if the absolute value of the exposure correction value obtained in the first exposure control mode is larger than the predetermined value, the exposure control step comprises performing the exposure control for photographing by using the exposure value determined in the second exposure control mode.

* * * * *